United States Patent
Almajnouni et al.

(10) Patent No.: US 11,965,133 B2
(45) Date of Patent: Apr. 23, 2024

(54) METHODS FOR PROCESSING HYDROCARBON FEED STREAMS

(71) Applicants: Saudi Arabian Oil Company, Dhahran (SA); King Abdullah University of Science and Technology, Thuwal (SA)

(72) Inventors: Khalid Ali Almajnouni, Jeddah (SA); Shatha Ali Alabbad, Dammam (SA); Abdulelah Alghadeer, Khobar (SA); Ola Ali, Thuwal (SA); Isidoro Morales Osorio, Thuwal (SA); Abdennour Bourane, Dhahran (SA); Wei Xu, Thuwal (SA); Jorge Gascon Sabate, Thuwal (SA); Jullian Vittenet, Thuwal (SA); Mohammed Alabdullah, Thuwal (SA); Alberto Rodriguez-Gomez, Thuwal (SA); Marcus John Killingworth, Dhahran (SA)

(73) Assignees: Saudi Arabian Oil Company, Dhahran (SA); King Abdullah University of Science and Technology, Thuwal (SA)

( * ) Notice: Subject to any disclaimer, the term of this patent is extended or adjusted under 35 U.S.C. 154(b) by 0 days.

(21) Appl. No.: 18/059,761

(22) Filed: Nov. 29, 2022

(65) Prior Publication Data
US 2023/0167370 A1 Jun. 1, 2023

Related U.S. Application Data

(60) Provisional application No. 63/284,056, filed on Nov. 30, 2021.

(51) Int. Cl.
*C10G 11/18* (2006.01)
*C10G 69/06* (2006.01)

(52) U.S. Cl.
CPC .......... *C10G 11/187* (2013.01); *C10G 69/06* (2013.01); *C10G 2300/1033* (2013.01); *C10G 2300/807* (2013.01)

(58) Field of Classification Search
CPC .......... C10G 11/187; C10G 69/06; C10G 2300/1033; C10G 2300/807; C10G 11/00;
(Continued)

(56) References Cited

U.S. PATENT DOCUMENTS 3,498,907 A * 3/1970 Doelp, Jr. .............. C10G 65/06
585/277
3,551,513 A 12/1970 Suzukawa et al.
(Continued)

FOREIGN PATENT DOCUMENTS

CN 102086402 A 6/2011
WO 2001079392 A2 10/2001
(Continued)

OTHER PUBLICATIONS

Notification of Transmittal of the International Search Report and the Written Opinion of the International Searching Authority, or the Declaration dated Mar. 15, 2023 pertaining to International application No. PCT/US2022/051206 filed Nov. 29, 2022, pp. 1-13.

*Primary Examiner* — Prem C Singh
*Assistant Examiner* — Juan C Valencia
(74) *Attorney, Agent, or Firm* — DINSMORE & SHOHL LLP (57) ABSTRACT

A hydrocarbon feed stream may be processed by a method that may include catalytically cracking a hydrocarbon feed stream in a counter-current reactor to produce a first effluent stream, and processing a portion or all of the first effluent stream by at least one or more separations. The at least one or more separations may form at least a second effluent stream including at least 95 wt. % $C_4$-$C_6$ hydrocarbons, and
(Continued)

a third effluent stream including at least 95 wt. % of ethane, propane, or a combination thereof. In some embodiments, the method may further include catalytically cracking a portion or all of the second effluent stream in a second reactor to form a second reactor effluent stream, combining a portion of all of the second reactor effluent stream with the first effluent stream, steam cracking a portion or all of the third effluent stream to form a steam cracked effluent stream, and combining a portion or all of the steam cracked effluent stream with the first effluent. In other embodiments, the method may further include passing a portion or all of the second effluent stream to the counter-current reactor, steam cracking a portion or all of the third effluent stream to form a steam cracked effluent stream, and combining a portion or all of the steam cracked effluent stream with the first effluent stream.

19 Claims, 4 Drawing Sheets

(58) Field of Classification Search
CPC .... C10G 51/04; C10G 9/36; B01J 8/12; B01J 8/1809; B01J 8/24; B01J 2208/00584
See application file for complete search history.

(56) References Cited

U.S. PATENT DOCUMENTS

| | | |
|---|---|---|
| 3,708,552 A | 1/1973 | Kunii et al. |
| 4,552,645 A | 11/1985 | Gartside et al. |
| 5,462,652 A | 10/1995 | Wegerer |
| 5,944,982 A | 8/1999 | Lomas |
| 6,656,346 B2 | 12/2003 | Ino et al. |
| 6,869,521 B2 | 3/2005 | Lomas |
| 7,425,258 B2 | 9/2008 | Chen et al. |
| 7,479,218 B2 | 1/2009 | Letzsch |
| 7,658,837 B2 | 2/2010 | Soares Cerqueira et al. |
| 9,771,530 B2 | 9/2017 | Sayed et al. |
| 2007/0205139 A1 | 9/2007 | Kulprathipanja et al. |
| 2011/0108458 A1 | 5/2011 | Leonard et al. |
| 2019/0316041 A1 | 10/2019 | Tian et al. |
| 2019/0316047 A1 | 10/2019 | Al-Majnouni et al. |
| 2021/0179514 A1 * | 6/2021 | Thinon ............ C07C 4/04 |

FOREIGN PATENT DOCUMENTS

| | | | |
|---|---|---|---|
| WO | 2013089885 A1 | 6/2013 | |
| WO | 2014011759 A1 | 1/2014 | |
| WO | 2020109885 A1 | 6/2020 | |
| WO | 2021019465 A1 | 2/2021 | |
| WO | WO-2021019465 A1 * | 2/2021 | ............ C10G 11/16 |

* cited by examiner

METHODS FOR PROCESSING HYDROCARBON FEED STREAMS

CROSS-REFERENCE TO RELATED APPLICATIONS

This application claims priority to U.S. Provisional Patent Application 63/284,056, filed Nov. 30, 2021, and entitled "CHEMICAL PROCESSING APPARATUSES AND METHODS," the entirety of which is incorporated by reference is the present disclosure.

TECHNICAL FIELD

The present disclosure relates to chemical processing and, more specifically, to methods of processing hydrocarbons.

BACKGROUND

Light olefins, including ethylene, propylene, and butene, and aromatics, including benzene, toluene, and xylene, are basic intermediates used by a large portion of the petrochemical industry. Traditionally, light olefins and aromatics may be produced by thermal cracking of petroleum fractions such as naphtha, kerosene, or gas oil. Light olefins and aromatics could also be produced by catalytic cracking processes. As the demand for light olefins and aromatics increases, there is a need for improved methods of producing light olefins and aromatics.

SUMMARY

Described herein are methods of processing hydrocarbon feedstocks in order to produce one or more products that may include olefins and aromatics. These methods of processing hydrocarbon feedstocks may utilize multiple reactors, where one or more of these reactors may be a fluidized catalytic cracking unit. A hydrocarbon stream that may comprise $C_4$-$C_6$ hydrocarbons may be recycled in the process, as described herein. Further, the methods of processing hydrocarbon feedstocks may utilize one or more stream crackers in order to convert at least methane, ethane, and butane components of the system to olefins that may then also be recycled.

According to one or more embodiments described herein, a hydrocarbon feed stream may be processed by a method that may comprise catalytically cracking a hydrocarbon feed stream in a counter-current reactor to produce a first effluent stream, and processing a portion or all of the first effluent stream by at least one or more separations. The at least one or more separations may form at least a second effluent stream comprising at least 95 wt. % $C_4$-$C_6$ hydrocarbons, and a third effluent stream comprising at least 95 wt. % of ethane, propane, or a combination thereof. The method may further comprise catalytically cracking a portion or all of the second effluent stream in a second reactor to form a second reactor effluent stream, combining a portion of all of the second reactor effluent stream with the first effluent stream, steam cracking a portion or all of the third effluent stream to form a steam cracked effluent stream, and combining a portion or all of the steam cracked effluent stream with the first effluent.

According to one or more additional embodiments described herein, a hydrocarbon feed stream may be processed by a method that may comprise catalytically cracking a hydrocarbon feed stream in a counter-current reactor to produce a first effluent stream, and processing a portion or all of the first effluent stream by at least one or more separations. The at least one or more separations may form at least a second effluent stream comprising at least 95 wt. % $C_4$-$C_6$ hydrocarbons, and a third effluent stream comprising at least 95 wt. % of ethane, propane, or a combination thereof. The method may further comprise passing a portion or all of the second effluent stream to the counter-current reactor, steam cracking a portion or all of the third effluent stream to form a steam cracked effluent stream, and combining a portion or all of the steam cracked effluent stream with the first effluent stream.

These and other embodiments are described in more detail in the Detailed Description. It is to be understood that both the foregoing general description and the following detailed description present embodiments of the described technology, and are intended to provide an overview or framework for understanding the nature and character of the described technology as it is claimed. The accompanying drawing is included to provide a further understanding of the described technology and are incorporated into and constitute a part of this specification. The drawing illustrates various embodiments and, together with the description, serve to explain the principles and operations of the described technology. Additionally, the drawing and descriptions are meant to be merely illustrative, and are not intended to limit the scope of the claims in any manner.

BRIEF DESCRIPTION OF THE DRAWING

The following detailed description of specific embodiments of the present disclosure can be best understood when read in conjunction with the following drawing, where like structure is indicated with like reference numerals and wherein.

For the purpose of describing the simplified schematic illustrations and descriptions of the relevant figures, the numerous valves, temperature sensors, electronic controllers and the like that may be employed and well known to those of ordinary skill in the art of certain chemical processing operations are not included. Further, accompanying components that are often included in typical chemical processing operations, such as air supplies, catalyst hoppers, and flue gas handling systems, are not depicted. Accompanying components, such as bleed streams, spent catalyst discharge subsystems, and catalyst replacement sub-systems are also not shown. It should be understood that these components are within the spirit and scope of the present embodiments disclosed. However, operational components, such as those described in the present disclosure, may be added to the embodiments described in this disclosure.

It should further be noted that arrows in the drawing refer to process streams. However, the arrows may equivalently refer to transfer lines which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawing may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that according to the embodiments presented in the relevant figures, an arrow between two system components may signify that the stream is not processed between the two system components. In other embodiments, the stream signified by the arrow may have substantially the same composition throughout its transport between the two system components. Additionally, it should be understood that in one or more embodiments, an arrow may represent that at least 75 wt. %, at least 90 wt. %, at least 95 wt. %, at least 99 wt. %, at least 99.9 wt. %, or even 100 wt. % of the stream is transported between the system components. As such, in some embodiments, less than all of the streams signified by an arrow may be transported between the system components, such as if a slip stream is present.

It should be understood that two or more process streams are "mixed" or "combined" when two or more lines intersect in the schematic flow diagrams of the relevant figures. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments, some embodiments of which are illustrated in the accompanying drawing. Whenever possible, the same reference numerals will be used throughout the drawing to refer to the same or similar parts.

DETAILED DESCRIPTION

Figure 1:
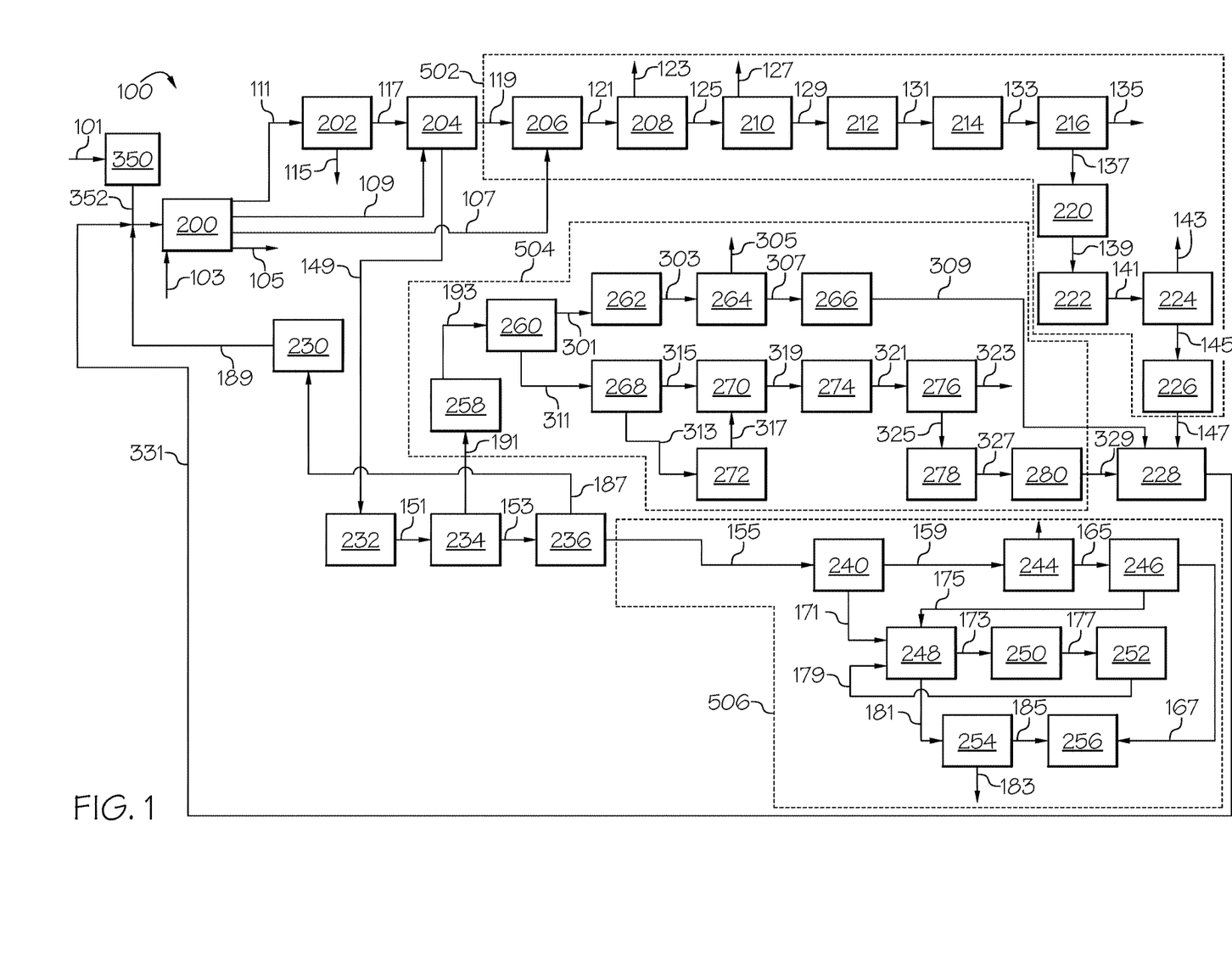
FIG. 1 schematically depicts a chemical processing system, according to one or more embodiments disclosed herein.

The present disclosure is directed to methods of processing hydrocarbon feedstocks. The methods are described in the context of the system of FIG. 1, but it is contemplated that many other systems may be suitable for the methods described herein. In particular, other systems and methods than those described with respect to FIG. 1 may be suitable, such as, without limitation, alternative separation schemes, alternative stream processing, and the ordering of the separation and/or processing steps disclosed. In particular, FIG. 1 will be described in detail herein, where various streams and processes described herein will be described in the context of the system of FIG. 1. However, the steps, streams, or other features of the disclosed methods stand independent of the system of FIG. 1, and FIG. 1 is merely provided to show one or more suitable systems as presently contemplated.

In one or more embodiments, the methods described herein may utilize catalytically cracking a hydrocarbon feed stream in a counter-current reactor, as is described in detail herein. The effluent of the counter-current reactor may be referred to herein as a "first effluent stream." In one or more embodiments as is shown in the chemical processing system 100 of FIG. 1, the hydrocarbon feed stream may be stream 101, the counter-current reactor may be reactor 350, and the first effluent stream may be stream 352.

According to embodiments, the methods described herein may include processing all or a portion of the first effluent by at least one or more separations to form at least a "second effluent stream." The second effluent stream may comprise at least 95 wt. % $C_4$-$C_6$ hydrocarbons, such as at least 96 wt. %, at least 97 wt. %, at least 98 wt. %, at least 99 wt. %, or even at least 99.9 wt. % $C_4$-$C_6$ hydrocarbons. In one or more embodiments as is shown in the chemical processing system 100 of FIG. 1, the second effluent stream may be third light hydrocarbon stream 187. The one or more separations may be performed by, for example, the main fractionator unit 200 and other devices discussed hereinbelow in detail with respect to FIG. 1.

According to some embodiments, a portion or all of the second effluent stream may be passed to a second reactor. The methods described herein may include cracking at least a portion of the second effluent stream in a second reactor to form a "second reactor effluent stream." In one or more embodiments, the methods described herein may further include combining a portion or all of the second reactor effluent stream with the first effluent stream. In one or more embodiments as is shown in the chemical processing system 100 of FIG. 1, the second effluent stream may be third light hydrocarbon stream 187, the second reactor may be the second reactor unit 230, the second reactor effluent stream may be second reactor unit effluent stream 189, and the first effluent may be stream 352, as is discussed below with respect to FIG. 1. As described herein, combining a portion or all of the second reactor effluent stream with the first effluent stream may include several schemes, such as where the two streams are mixed (as shown in FIG. 1), or where the two steams are passed to the same unit, such as both being passed as separated stream to the main fractionator unit 200 in the embodiment of FIG. 1.

Figure 4:
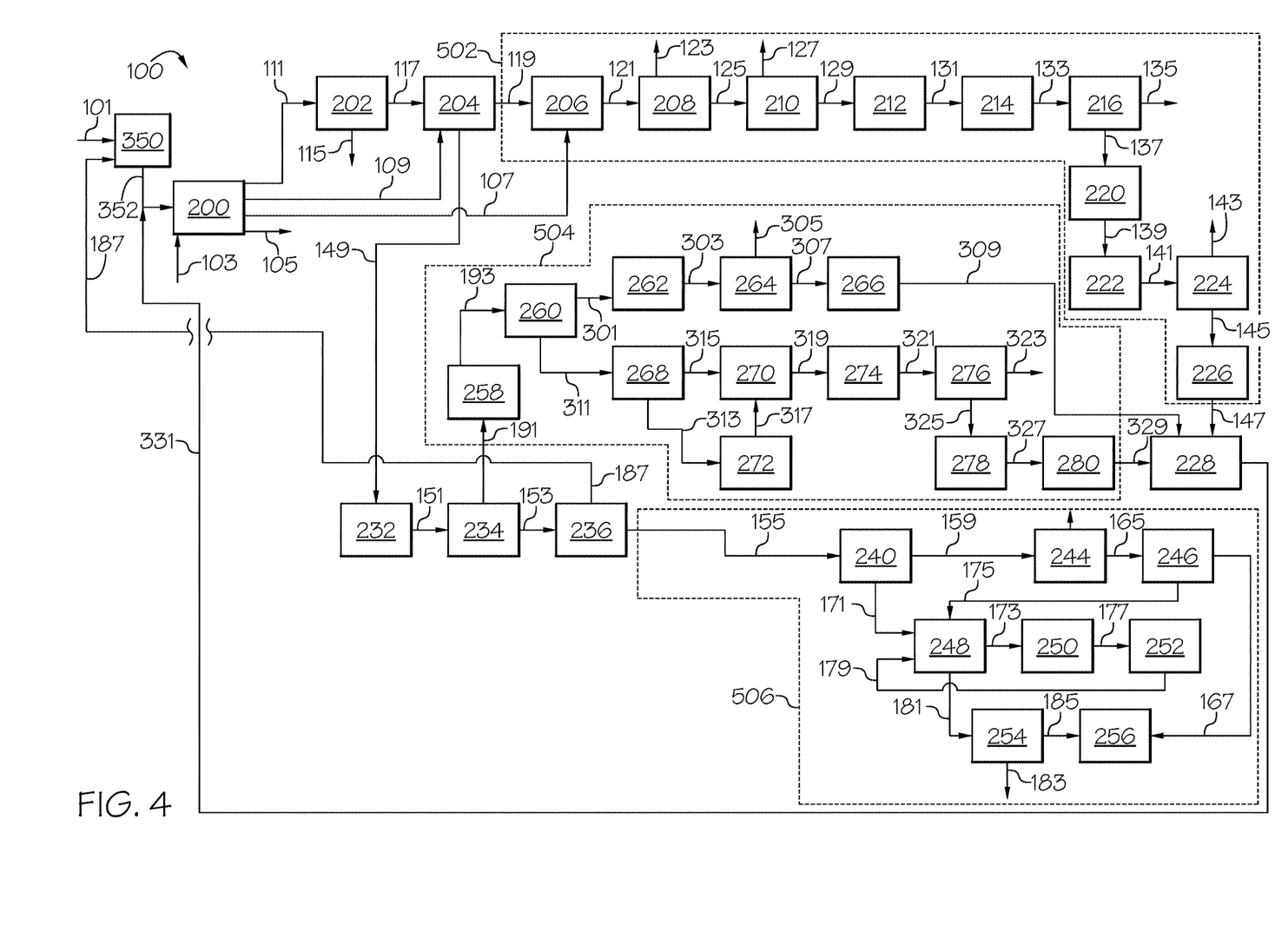
FIG. 4 schematically depicts another chemical processing system, according to one or more embodiments disclosed herein.

According to other embodiments, all or a portion of the second effluent stream may be passed to the counter-current reactor. In such embodiments, a second reactor may not be present. FIG. 4 shows a system that may utilize this scheme, where FIG. 4 is identical to FIG. 1 unless stated or depicted otherwise. In one or more embodiments as is shown in the chemical processing system 100 of FIG. 4, the second effluent stream may be third light hydrocarbon stream 187, and the counter current reactor may be reactor 350. In FIG. 4, the third light hydrocarbon stream 187 is passed to reactor 350. In other embodiments, all or a portion of the second effluent stream may be passed to the counter-current reactor by combining the second effluent stream with the hydrocarbon feed stream (not depicted in FIG. 4).

According to one or more embodiments described herein, the processing of the first effluent by at least one or more separations may additionally form a "third effluent stream." The third effluent stream may comprise at least 95 wt. % of ethane, propane, or a combination thereof. The third effluent stream may comprise at least 95 wt. % ethane, propane, or a combination thereof, such as at least 96 wt. %, at least 97 wt. %, at least 98 wt. %, at least 99 wt. %, or even at least 99.9 wt. % ethane, propane, or a combination thereof.

In some embodiments, the third effluent stream comprises at least 95 wt. % of ethane, and the processing of the first effluent by at least one or more separations may additionally form a fourth effluent stream that comprises at least 95 wt. % propane. In such embodiments, the third effluent stream may comprise at least 95 wt. %, at least 96 wt. %, at least 97 wt. %, at least 98 wt. %, at least 99 wt. %, or even at least 99.9 wt. % ethane, and the fourth effluent stream may comprise at least 95 wt. %, at least 96 wt. %, at least 97 wt. %, at least 98 wt. %, at least 99 wt. %, or even at least 99.9 wt. % propane. Such an embodiment is described with respect to the embodiment of FIG. 1, where the third effluent stream may be analogous to the $C_2$ splitter effluent stream 145, and the fourth effluent stream may be analogous to the $C_3$ splitter effluent stream 307.

In one or more embodiments, all or a portion of the third effluent stream (as well as the fourth effluent stream if present) may be steam cracked, forming a steam cracked effluent stream. The steam cracked effluent stream may then be combined with the first effluent stream a recycle stream. In the embodiments of FIG. 1, this step is analogous to the $C_2$ splitter effluent stream 145 being passed to the first steam cracker 226, and/or the $C_3$ splitter effluent stream 307 being passed to the second steam cracker 266, as is described in detain hereinbelow. As described herein, the process may further include combining the steam cracked effluent stream with the first effluent stream. This step may comprise mixing the steam cracked effluent stream with the first effluent stream, or passing the stream cracked effluent stream and the first effluent stream to a common device such as main fractionator unit 200 in the embodiment of FIG. 1. In the embodiment of FIG. 1, this step is analogous to the steam cracker recycle effluent stream 331 being combined with the stream 352.

According to additional embodiments, the processing the first effluent by at least one or more separations forms a fifth effluent stream comprising at least 90 wt. % $C_7$-$C_{12}$ hydrocarbons. The methods described herein may further comprises processing the fifth effluent stream by BTX extraction to form a sixth effluent stream. In the embodiment of FIG. 1, such steps may be carried out in the aromatics processing system 506. The sixth effluent stream may be analogous to the first heavy aromatics column effluent stream 183, in the embodiment of FIG. 1.

In one or more embodiments, the methods described herein may further include passing the sixth effluent stream to the second reactor, or passing the sixth effluent stream to the counter-current reactor. Such recycling of the sixth effluent stream (analogous to first heavy aromatics column effluent stream 183) is not depicted in FIG. 1 or 4, but is contemplated herein.

In one or more embodiments, the hydrocarbon feed stream (corresponding to stream 101 in the example embodiment of FIG. 1) may generally comprise any hydrocarbon material. The hydrocarbon feed stream may include any oil stream with varying final boiling points ranging from 40° C. to over 800° C. For example, the feed stream may be a stream ranging from light naphtha to untreated crude oil.

In some embodiments, the hydrocarbon feed stream may comprise or consist of crude oil, or may comprise or consist of a mixture of crude oil and stream (sometimes used for dilution of the crude oil). As used in this disclosure, the term "crude oil" is to be understood to mean a mixture of petroleum liquids, gases, or combinations of liquids and gases, including some embodiments with impurities such as sulfur-containing compounds, nitrogen-containing compounds and metal compounds that has not undergone significant separation or reaction processes. Crude oils are distinguished from fractions of crude oil. In additional embodiments, the hydrocarbon feed stream may consist or comprise vacuum residue, tar sands, bitumen, atmospheric residue, vacuum gas oils, demetalized oils, naphtha streams, other hydrocarbon streams, or combinations of these materials. The hydrocarbon feed stream may include one or more non-hydrocarbon constituents, such as one or more heavy metals, sulphur compounds, nitrogen compounds, inorganic components, or other non-hydrocarbon compounds.

If the hydrocarbon feed stream comprises crude oil, the crude oil may have an American Petroleum Institute (API) gravity of from 22 degrees to 40 degrees. For example, the hydrocarbon feed stream 102 utilized may be an Arab heavy crude oil. (API gravity of approximately 28°), Arab medium (API gravity of approximately 30°), Arab light (API gravity of approximately 33°), or Arab extra light (API gravity of approximately 39°). Example properties for one particular grade of Arab heavy crude oil are provided subsequently in Table 1. It should be understood that, as used in this disclosure, a "hydrocarbon feed" may refer to a raw hydrocarbon material which has not been previously treated, separated, or otherwise refined (such as crude oil) or may refer to a hydrocarbon material which has undergone some degree of processing, such as treatment, separation, reaction, purifying, or other operation, prior to being introduced to the hydrocarbon feed conversion system 100 in the hydrocarbon feed stream.

In general, the contents of the hydrocarbon feed stream may include a relatively wide variety of chemical species based on boiling point. For example, the hydrocarbon feed stream 102 may have composition such that the difference between the 5 wt. % boiling point and the 95 wt. % boiling point of the hydrocarbon feed stream 102 is at least 100° C., at least 200° C., at least 300° C., at least 400° C., at least 500° C., or even at least 600° C.

The hydrocarbon stream may contain steam with ratios of steam/hydrocarbon (wt/wt) 1.20:1, or 1:1, or 0.8:1, or 0.5:1, or 0.3:1 or 0.1:1 or any combination between any of these ranges.

Figure 2:
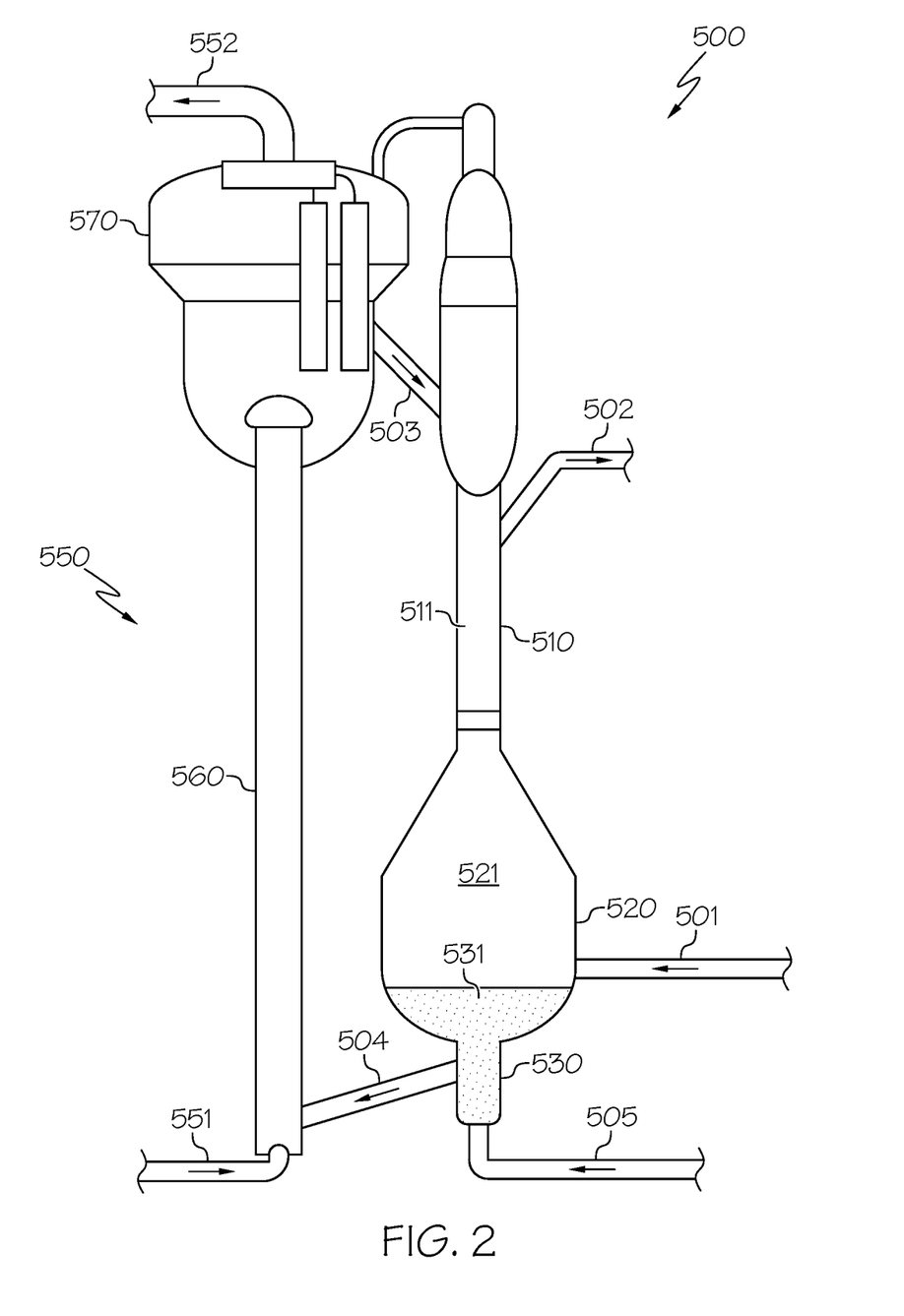
FIG. 2 schematically depicts a counter-current reactor, according to one or more embodiments disclosed herein.
Figure 3:
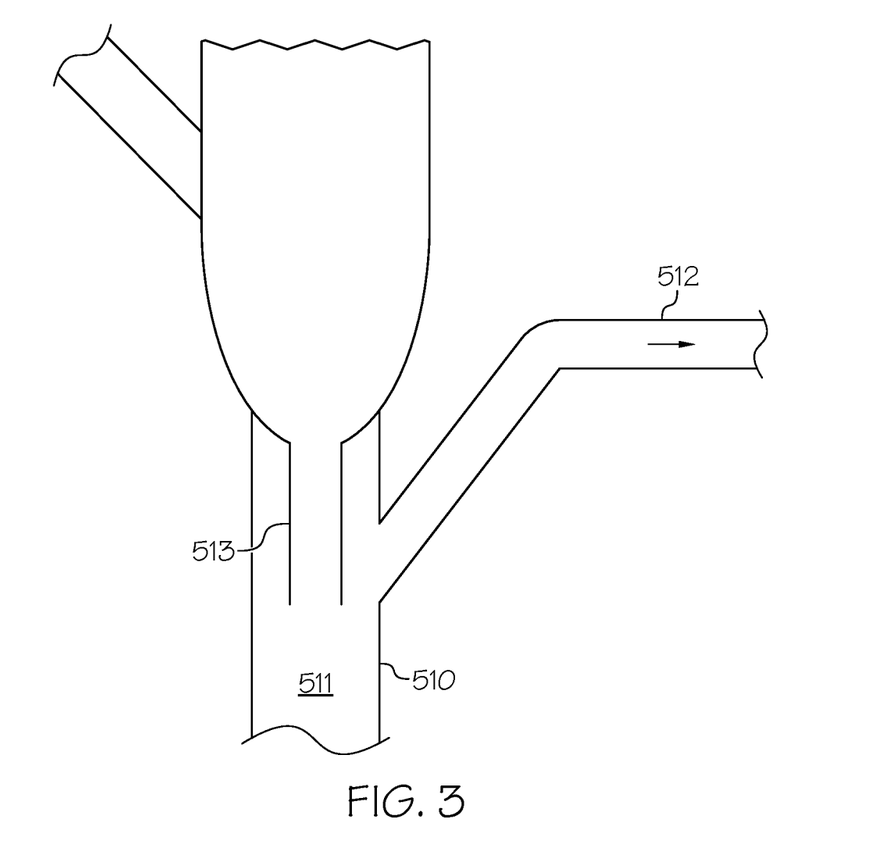
FIG. 3 schematically depicts another view of the counter-current reactor of FIG. 2, according to one or more embodiments disclosed herein.

As described herein, in one or more embodiments, the hydrocarbon feed stream may be catalytically cracked in a counter-current reactor to produce a first effluent stream. Embodiments of a counter-current reactor, such as that which may be used in the process described herein, are shown in FIGS. 2 and 3 and described subsequently. In one or more embodiments, the reactor disclosed in US 2022/0033714 A1 may be suitable, and the teachings of this publication are incorporated by reference in their entirety.

Referring now to FIG. 2, a reactor 500 (corresponding, for example, to the reactor 350 of FIG. 1) is schematically depicted. The reactor comprises an upper reactor portion 510, a lower reactor portion 520, and a steam stripping portion 530. The upper reactor portion 110 may comprise an upper reaction zone 511. The lower reactor portion 520 may define a lower reaction zone 521. A hydrocarbon feed stream 501 may enter the lower reaction zone 521 through one or more feed inlets located in the lower reactor portion 520. The one or more feed inlets may be positioned at or near the bottom of the lower reactor portion 520. Additionally, the lower reactor portion 520 may comprise one or more catalyst outlets positioned at or near the bottom of the lower reactor portion 520. As described herein, at or near the bottom of the lower reactor portion 520 corresponds to positions in the bottom 10%, bottom 5%, or even bottom 1% of the height of the lower reactor portion 120.

The upper reactor portion 510 defines an upper reaction zone 511. The hydrocarbon feed stream 501 (which may correspond with the hydrocarbon feed stream 101 in the embodiment of FIG. 1) may move through the lower reaction zone 521 and into the upper reaction zone 511. The upper reactor portion 510 and the lower reactor portion 520 may be in fluid communication with each other. In one or more embodiments, the upper reactor portion 510 and the lower reactor portion may be adjacent to each other, with no intervening components or reactor portions. In one or more embodiments, the hydrocarbon feed stream 501 may pass directly from the lower reactor portion 520 to the upper reactor portion 510.

Referring to FIG. 3, a cross-sectional view of the upper reactor portion 510 is shown. The upper reactor portion 510 includes a hydrocarbon product outlet 512 and a catalyst inlet 513, which may be positioned at or near the top of the upper reactor portion 510. As described herein, at or near the top of the upper reactor portion 510 corresponds to positions in the top 10%, top 5%, or even top 1% of the height of the upper reactor portion 510. Catalyst may enter the upper reactor portion 510 through catalyst inlet 513. As shown in FIG. 3, the catalyst inlet 513 may extend into the upper reactor portion 510 so the catalyst enters the upper reaction zone 511 below the hydrocarbon product outlet 512. As shown in FIG. 3, the hydrocarbon product outlet 512 is defined by an opening in the upper reactor portion 510, and the hydrocarbon product outlet 512 does not extend into upper reaction zone 511. Thus, catalyst may enter the upper reaction zone below the hydrocarbon outlet 512. Without wishing to be bound by theory, it is believed that introducing the catalyst below the hydrocarbon product outlet 512 may reduce the amount of catalyst entrained in the hydrocarbon product exiting the reactor 500.

In one or more embodiments, the catalyst may comprise a zeolite catalyst, for example, USY zeolite, ZSM-5 zeolite, or a combination of multiple types of suitable zeolite catalysts. Alternatively, the catalyst may comprise other suitable solid acid catalysts. In one or more embodiments, the catalyst may comprise fresh catalyst, regenerated catalyst, or combinations of fresh and regenerated catalyst as described in further detail herein. In one or more embodiments, the catalyst may comprise binders, promotors, inert, and matrix to have acceptable physical and chemical properties such as catalyst attrition index and catalyst density so that it can be used in the proposed reactor configuration.

As shown in FIG. 2, the lower reactor portion 520 may have a larger cross-sectional area than the upper reactor portion 510. In one or more embodiments, the lower reactor portion 520 may have a substantially similar cross-sectional area to the upper reactor portion 510.

In one or more embodiments, the upper reaction zone 511 may operate in a counter-current plug flow regime. In one or more embodiments, the hydrocarbon feed 501 may exhibit plug flow as it moves up through the upper reaction zone 511. Likewise, the catalyst may exhibit plug flow as it moves down through the upper reaction zone 511. Since the flow of catalyst is opposed to the flow of the hydrocarbon feed, the flows are counter-current and the upper reaction zone 511 may operate in a counter-current plug flow regime.

In one or more embodiments, the catalyst-to-oil ratio in the upper reaction zone 511 may be from 5 to 100. For example, the catalyst-to-oil ratio in the upper reaction zone 511 may be from 5 to 100, from 10 to 100, from 20 to 100, from 30 to 100, from 40 to 100, from 50 to 100, from 60 to 100, from 70 to 100, from 80 to 100, or even from 90 to 100. In further examples, the catalyst-to-oil ratio in the upper reaction zone 511 may be from 5 to 90, from 5 to 80, from 5 to 70, from 5 to 60, from 5 to 50, from 5 to 40, from 5 to 30, from 5 to 20, or even from 5 to 10. Without wishing to be bound by theory, it is believed that there is less constraint on catalyst-to-oil ratios suitable for use in the upper reaction zone 511 because the catalyst may flow through the upper reaction zone 511 by gravity instead of being transported through the reactor by the flow of hydrocarbons. Additionally, a high catalyst-to-oil ratio indicates a large amount of catalyst within the upper reaction zone 511, which is believed to lead to increased conversion of the hydrocarbon feed to light olefins.

The catalyst may move through the upper reaction zone 511 and into the lower reaction zone 521. In one or more embodiments, the catalyst may pass directly from the upper reaction zone 511 to the lower reaction zone 521. The lower reaction zone 521 may operate in a dense bed fluidization regime. In one or more embodiments, the catalyst may pass from the upper reaction zone 511 to the lower reaction zone 521 and form a dense fluidized bed in the lower reaction zone 521. As described herein, a "dense bed fluidization regime" refers to a fluidization regimes in which the fluidized bed has a clearly defined upper limit or surface to the dense bed. For example, dense bed fluidization regimes include the smooth fluidization, bubbling fluidization, slugging fluidization, and turbulent fluidization regimes. In a dense fluidized bed, the particle entrainment rate may be low, but may increase as the velocity of the gas flowing through the bed increases.

In one or more embodiments, the weight hourly space velocity (WHSV) of the lower reaction zone 521 may be from 1 to 200 $hr^{-1}$. For example, the WHSV of the lower reaction zone 521 may be from 1 to 200 $hr^{-1}$, from 1 to 175 $hr^{-1}$, from 1 to 150 $hr^{-1}$, from 1 to 125 $hr^{-1}$, from 1 to 100 $hr^{-1}$, from 1 to 75 $hr^{-1}$, from 1 to 50 $hr^{-1}$, or even from 1 to 25 $hr^{-1}$. In further examples, the WHSV of the lower reaction zone 121 may be from 25 to 200 $hr^{-1}$, from 50 to 200 $hr^{-1}$, from 75 to 200 $hr^{-1}$, from 100 to 200 $hr^{-1}$, from 125 to 200 $hr^{-1}$, from 150 to 200 $hr^{-1}$, or even from 175 to 200 $hr^{-1}$. WHSV may be used to describe the amount of catalyst in the dense bed of the lower reaction zone 521. Without wishing to be bound by theory, it is believed that a dense bed allows a large amount of catalyst to be present in the lower reaction zone, which may increase the yield of light olefins.

As the hydrocarbon feed stream 501 and the catalyst move through the reactor 500, the hydrocarbon feed stream 501 may have an upward superficial velocity through a horizontal cross-section of the reactor 500, and the catalyst may have a downward superficial velocity through a horizontal cross-section of the reactor 500. As described herein, "superficial velocity" refers to the velocity at which an individual phase flows through a given cross-sectional area. The bulk flow of a phase is used to determine superficial velocity of that phase; thus, individual particles or molecules within a phase may move in a direction different from, or even opposite to, the bulk flow of a phase without affecting the direction of the superficial velocity of that phase.

For example, the hydrocarbon feed stream 501 flows from the feed inlet in the lower reactor portion 520 to the hydrocarbon product outlet 512 in the upper reactor portion 510. Thus, the bulk flow of hydrocarbon feed stream 501 moving through a horizontal cross-section of the reactor 500 is in an upward direction, resulting in an upward superficial velocity. Likewise, the catalyst flows from the catalyst inlet 513 to the catalyst outlet in the steam stripping portion 530 of the reactor 500, and the bulk flow of the catalyst moving through a horizontal cross-section of the reactor 500 is in a downward direction, resulting in a downward superficial velocity. In one or more embodiments, the upward superficial velocity of the hydrocarbon feed stream 501 and the downward superficial velocity of the catalyst results in a counter-current flow pattern between the hydrocarbon feed stream 501 and the catalyst. Thus, in one or more embodiments, the hydrocarbon feed stream 501 and catalyst move with a counter-current orientation.

Without wishing to be bound by theory, it is believed that contacting the hydrocarbon feed stream 501 and the catalyst in a counter-current manner may prevent back-mixing of catalyst that may occur in in traditional riser reactors and may promote undesired side reactions that negatively affect the production of light olefins. Additionally, it is believed that contacting the hydrocarbon feed stream 501 and the catalyst in a counter-current manner may prevent core-annular flow through the reactor where the catalyst has high concentration near the reactor walls and a low concentration toward the center of the reactor where a majority of the hydrocarbon flow occurs. Generally, core-annular flow reduces the amount of contact between the catalyst and the hydrocarbon, and thus, may reduce the conversion of hydrocarbon feed to light olefins.

Without wishing to be bound by theory, it is also believed that counter-current flow may also result in increased yield of olefins by allowing the more reactive chemicals in the hydrocarbon feed to contact less active catalyst, and less active catalyst to contact more reactive chemicals in the hydrocarbon feed. Generally, the catalyst in the lower reaction zone 521 has already contacted hydrocarbons in the upper reaction zone 511. Thus, the catalyst in the lower reaction zone 521 is usually partially spent and has a lower activity than the catalyst in the upper reaction zone 511. Contacting the hydrocarbon feed with a large amount of less active catalyst in the lower reaction zone 521 may allow the more reactive chemicals in the hydrocarbon feed to crack in the lower reaction zone 521 while contacting the less active catalyst. This in turn allows the more active catalyst in the upper reaction zone 511 to crack the less reactive chemicals in the hydrocarbon feed, increasing the yield of light olefins produced from the hydrocarbon feed.

In one or more embodiments, the superficial velocity of the hydrocarbon feed stream 501 moving through the upper reactor portion 511 is 3.0 m/s or less. For example, the superficial velocity of the hydrocarbon feed stream through the upper reactor portion 511 may be 3.0 m/s or less, 2.0 m/s or less, 1.0 m/s or less, 0.9 m/s or less, 0.8 m/s or less, 0.7 m/s or less, 0.6 m/s or less, 0.5 m/s or less, or even 0.4 m/s or less. Without wishing to be bound by theory, it is believed that a hydrocarbon feed stream superficial velocity below 3.0 m/s within the upper reactor portion 511 may result in increased contact between the catalyst and the hydrocarbons, which may in turn lead to increased conversion of the hydrocarbon feed to light olefins. To keep the superficial velocity of the hydrocarbon feed stream 501 within the desired range, the residence time of the hydrocarbons within the reactor 500 may be controlled by adjusting the height of the upper reactor portion 510 and the height of the lower reactor portion 520.

In one or more embodiments, the residence time of the hydrocarbon feed stream 101 within the reactor 500 is from 0.1 to 10 seconds. For example, the residence time of the hydrocarbon feed stream 501 within reactor 100 may be from 0.1 to 10 seconds, from 0.5 to 10 seconds, from 1 to 10 seconds, from 2 to 10 seconds, from 3 to 10 seconds, from 4 to 10 seconds, from 5 to 10 seconds, from 6 to 10 seconds, from 7 to 10 seconds, from 8 to 10 seconds, or even from 9 to 10 seconds. In further examples, the residence time of the hydrocarbon feed stream 501 in the reactor 100 may be from 0.1 to 9 seconds, from 0.1 to 8 seconds, from 0.1 to 7 seconds, from 0.1 to 6 seconds, from 0.1 to 5 seconds, from 0.1 to 4 seconds, from 0.1 to 3 seconds, from 0.1 to 2 seconds, or even from 0.1 to 1 second.

As the hydrocarbon feed stream 501 contacts the catalyst, at least a portion of the hydrocarbon feed stream 501 may be cracked to form a hydrocarbon product. In one or more embodiments, the temperature within the reactor 500 may be from 420° C. to 750° C. to facilitate the cracking of hydrocarbon feed stream 501. For example, the temperature within the reactor 500 may be from 460° C. to 750° C., from 500° C. to 750° C., from 540° C. to 750° C., from 580° C. to 750° C., from 620° C. to 750° C., from 660° C. to 750° C., or even from 700° C. to 750° C. In further examples, the temperature within the reactor 500 may be from 420° C. to 710° C., from 420° C. to 670° C., from 420° C. to 630° C., from 420° C. to 590° C., from 420° C. to 550° C., or even from 420° C. to 510° C. In yet further embodiments, the temperature within the reactor 500 may be from 440° C. to 720° C., from 480° C. to 680° C.

Still referring to FIG. 2, in one or more embodiments, the hydrocarbon product (corresponding to stream 352 in FIG. 1 or the "first effluent stream" described herein) may comprise light olefins and other reactions products. For example the hydrocarbon product may comprise, ethylene, propylene, butene or combinations of these in addition to the other reactions products. In one or more embodiments, the other reaction products may comprise dry gas, aromatics, naphtha, light cycle oil, heavy cycle oil, and even heavy oil. In one or more embodiments, a hydrocarbon product stream 502 comprising light olefins may be passed from the upper reaction zone 511 through hydrocarbon product outlet 112 in the upper reactor portion 510. In one or more embodiments, the hydrocarbon product stream 502 may comprise catalyst entrained within the hydrocarbon product stream 502 which may be separated from the hydrocarbon product stream 502 in a separation device. Any suitable separation device, including a cyclone or series of cyclones, may be used to separate entrained catalyst from the hydrocarbon product stream 502. In one or more embodiments, the light olefins may be separated from the hydrocarbon product stream 502.

In one or more embodiments, cracking the hydrocarbon feed stream 501 may produce spent catalyst. Spent catalyst may be produced in both the upper reaction zone 511 and the lower reaction zone 521. In one or more embodiments, spent catalyst may comprise coke on the catalyst. The coke may reduce the activity of the catalyst, and spent catalyst may have reduced activity when compared to regenerated or fresh catalyst. In one or more embodiments, the non-circulating fluidized bed of the lower reaction zone 521 may comprise spent catalyst. Without wishing to be bound by theory, the more reactive components of the hydrocarbon feed stream may crack in the lower reaction zone because high catalytic activity is not required for those components to react. As the hydrocarbon feed passes from the lower reaction zone 521 to the upper reaction zone 511, the hydrocarbon feed will encounter more active, fresh or regenerated catalyst, and the less reactive components of the hydrocarbon feed will crack. Thus, the counter-current flow of the catalyst and the hydrocarbon feed stream 501 may result in increased conversion of hydrocarbon feed to light olefins.

In one or more embodiments, the reactor 500 may comprise a steam stripping portion 530 below the lower reactor portion 520. The steam stripping portion 530 may define a steam stripping zone 531. The steam stripping portion 530 may be in fluid communication with and adjacent to the lower reactor portion 520. In one or more embodiments, spent catalyst may pass from the lower reaction zone 521 to the steam stripping zone 531. In further embodiments, the spent catalyst may pass directly from the lower reaction zone 521 to the steam stripping zone 531. Steam may be passed to the steam stripping zone 531 by stream 505. In the steam stripping zone 531, steam may contact the spent catalyst and strip at least a portion of the hydrocarbon feed or hydrocarbon products from the spent catalyst. After contacting the steam in the steam stripping zone 531, spent catalyst may be passed in stream 504 from the reactor 500 through the catalyst outlet.

In one or more embodiments, the spent catalyst may be passed to a catalyst regenerator 550 where the spent catalyst is regenerated to form a regenerated catalyst. The catalyst regenerator 550 may comprise a riser 560 and a separator 570. The spent catalyst may enter the riser 560 through a catalyst inlet. In one or more embodiments, the riser 560 is in fluid communication with the steam stripping zone 531 of the reactor 500 and the spent catalyst may be passed directly from the steam stripping zone 531 to the riser 560. In one or more embodiments, an air stream 551 is passed to the riser 560, and the air and spent catalyst travel up riser 560. In one or more embodiments, the air stream 551 is used to oxidize at least a portion of the coke on the spent catalyst, restoring activity to the spent catalyst and forming a regenerated catalyst. The design of the regenerator in term of air velocity and distribution, catalyst residence time inside the regenerator, dense and free board section, and temperature, may all be known to a person skilled in the art.

The regenerated catalyst and air may move from riser 560 to separator 570. In one or more embodiments, the riser 560 and separator 570 are adjacent to each other and the regenerated catalyst and air move directly from the riser 560 to the separator 570. Separator 570 may be any suitable separation system for separating catalyst from air, including a cyclone separation system. In one or more embodiments, an air stream 552 may exit the separator 570. Additionally, regenerated catalyst may exit the separator 570 through a regenerated catalyst outlet. In one or more embodiments, the regenerated catalyst may be included in the catalyst of stream 503. In one or more embodiments, the separator 570 and the upper reactor portion 510 may be in fluid communication with each other and regenerated catalyst may be passed directly from the separator 570 of the regenerator 550 to the upper reaction zone 511 of the reactor 500 through catalyst inlet 513. In one or more embodiments, fresh catalyst may be added to catalyst in stream 503. In such embodiments, the catalyst may comprise both regenerated catalyst and fresh catalyst.

Now referring to the embodiment of FIG. 1 in detail, which is representative of at least one embodiment contemplated as included the general methods described herein. In one or more embodiments, the stream 352 produced by the counter-current reactor 350 may be passed to a main fractionator unit 200. The main fractionator unit 200 may be operable to produce multiple streams comprising various fractions of the entering streams, including the stream 352, and operable to receive one or more recycle streams produced from the processing that occurs downstream of the main fractionator unit 200. In some embodiments, steam 103 may be passed to the main fractionator unit 200. In one or more embodiments, the main fractionator unit 200 may be any unit that utilizes fractional distillation to separate the components passed to the unit. The main fractionator unit 200 may produce at least a wet gas stream 111, a $C_1$-$C_{12}$ stream 109, a light cycle oil stream 107, and a slurry oil stream 105. The wet gas stream 111 may comprise one or more of methane, ethane, propane, or butane separated from the streams entering the main fractionator unit 200. The light cycle oil stream 107 may comprise at or near diesel boiling range hydrocarbons separated from the streams entering the main fractionator unit. The slurry oil 105 may comprise high boiling point and high density residual oil components separated from the streams entering the main fractionator unit 200.

In some embodiments, the wet gas stream 111 may pass to a first compressor 202. The first compressor 202 may be any unit that is operable to maintain the desired pressure of the processing streams throughout the system in addition to removing one or more liquids from the wet gas stream 111. In some embodiments, the first compressor 202 may produce a first water stream 115 that is at least a portion of the water content from the wet gas stream 111. The first compressor 202 may produce a first compressor effluent stream 117 that is then passed to a high pressure separator 204. The $C_1$-$C_{12}$ stream 109 produced by the main fractionator unit 200 may be passed to the high pressure separator 204. The high pressure separator 204 may be any unit that is operable to separate the $C_1$-$C_{12}$ stream 109 and first compressor effluent stream 117 contents to produce at least a first light hydrocarbon stream 119 and a first heavy hydrocarbon stream 149. The first light hydrocarbon stream 119 may comprise one or more of hydrogen, $C_1$ hydrocarbons, and $C_2$ hydrocarbons. The first heavy hydrocarbon stream 149 may comprise $C_3$-$C_{12}$ hydrocarbons.

In one or more embodiments, the first light hydrocarbon stream 119 may pass to a $C_1$-$C_2$ processing system 502. This $C_1$-$C_2$ processing system 502 may first comprise passing the first light hydrocarbon stream 119 to an absorber unit 206. In some embodiments, the light cycle oil stream 107 may pass to the absorber unit 206. The absorber unit 206 may be any unit that is operable to absorb one or more unwanted substances from the first light hydrocarbon stream 119 and the light cycle oil stream 107 that is passed to the absorber unit 206 in order to produce an absorber unit effluent stream 121. The absorber unit effluent stream 121 may then be passed to a caustic scrubber 208. The caustic scrubber 208 may be any unit that is operable to remove $H_2S$ and other acidic components from the absorber unit effluent stream 121. The caustic scrubber 208 may produce a sour gas stream 123 and a caustic scrubber effluent stream 125. The sour gas stream 123 may comprise a gas stream including a portion of the $H_2S$ and other acidic components removed from the absorber unit effluent stream 121. The caustic scrubber effluent stream 125 may comprise the majority of the contents of the absorber unit effluent stream 121, where the $H_2S$ and other acidic component concentration of the caustic scrubber effluent stream 125 is less than that of the absorber unit effluent stream 121. The caustic scrubber effluent stream 125 may then be sent to one or more drying units 210. The one or more drying units 210 may be any unit that is operable to dehydrate the caustic scrubber effluent stream 125 and remove at least a portion of water vapor from the caustic scrubber effluent stream 125. The one or more drying units 210 may produce a second water stream 127 comprising at least a portion of the water vapor from the caustic scrubber effluent stream 125. The one or more drying units 210 may also produce a drying unit effluent stream 129, where the drying unit effluent stream 129 comprises less water vapor when compared to the caustic scrubber effluent stream 125.

In one or more embodiments, the drying unit effluent stream 129 may pass to a second compressor 212. The second compressor 212 may be any unit that is operable to maintain the desired pressure of the processing streams throughout the system in addition to removing one or more liquids from the drying unit effluent stream 129. The second compressor 212 may produce a second compressor effluent stream 131 that may then be passed to a cold box 214. The cold box 214 may be any unit that is operable to lower the temperature of the second compressor effluent stream 131. The cold box 214 may produce a cold box effluent stream 133, where the cold box effluent stream 133 may have a lower temperature than the second compressor effluent stream 131. The cold box effluent stream 133 may be passed to a demethanizer unit 216. The demethanizer unit 216 may be any unit that is operable to separate methane-rich gas from heavier hydrocarbons. The demethanizer unit 216 may produce at least a first demethanizer unit effluent stream 135 and a second demethanizer unit effluent stream 137. The first demethanizer unit effluent stream 135 may comprise hydrogen and $C_1$ hydrocarbons, including methane. The second demethanizer unit effluent stream 137 may comprise $C_2$ hydrocarbons.

In one or more embodiments, the second demethanizer unit effluent stream 137 may pass to a deethanizer unit 220. The deethanizer unit 220 may be any unit that is operable to separate ethane-rich gas from heavier hydrocarbons. The deethanizer unit 220 may produce at least a deethanizer unit effluent stream 139. Hydrocarbons heavier than ethane may be removed from the second demethanizer unit effluent stream 137 so that the deethanizer unit effluent stream 139 contains a higher concentration of ethane than the second demethanizer unit effluent stream 137. The deethanizer unit effluent stream 139 may be passed to a first selective hydrogenation unit 222. The first selective hydrogenation unit 222 may be any unit that is operable to achieve one or more of reducing the diolefin content of the deethanizer unit effluent stream 139 by hydrogenating diolefins, minimizing the saturation of olefins, and converting mercaptans and sulphides to heavier sulfur molecules. The first selective hydrogenation unit 222 may produce a first selective hydrogenation unit effluent stream 141. The first selective hydrogenation unit effluent stream 141 may be passed to a $C_2$ splitter 224. The $C_2$ splitter 224 may be any unit that is operable to separate at least a portion of the ethylene components of a stream from the rest of the stream. The $C_2$ splitter 224 may produce an ethylene stream 143 and a $C_2$ splitter effluent stream 145. The ethylene stream 143 may comprise at least a portion to the majority of the ethylene content of the first selective hydrogenation unit effluent stream. The $C_2$ splitter effluent stream 145 may comprise ethane. The $C_2$ splitter effluent stream 145 may be passed to a first steam cracker 226. The first steam cracker 226 may be any unit that is operable to convert at least a portion of the ethane components in the $C_2$ splitter effluent stream 145 to ethylene. The first steam cracker 226 may produce a first steam cracker effluent stream 147, where the first steam cracker effluent stream 147 contains a higher concentration of ethylene when compared to the $C_2$ splitter effluent stream 145. The first steam cracker effluent stream 147 may then be passed to a wash tower 228.

In one or more embodiments, the first heavy hydrocarbon stream 149 produced by the high pressure separator 204 may be passed to a stripper unit 232. The stripper unit 232 may be any unit operable to remove one or more unwanted components or contaminants from the first heavy hydrocarbon stream 149. The stripper unit 232 may produce a stripper unit effluent stream 151 that may then be sent to a debutanizer unit 234. The debutanizer unit 234 may be any unit that is operable to separate at least a portion of the $C_3$ hydrocarbons and $C_4$ hydrocarbons present in the stripper unit effluent stream 151. The debutanizer unit 234 may produce a second light hydrocarbon stream 191 and a second heavy hydrocarbon stream 153. The second light hydrocarbon stream 191 may comprise at least a portion of the $C_3$ hydrocarbons and $C_4$ hydrocarbons present in the stripper unit effluent stream 151. The second heavy hydrocarbon stream 153 may comprise at least a portion of the $C_4$ hydrocarbons and $C_5$-$C_{12}$ hydrocarbons present in the stripper unit effluent stream 151. The second heavy hydrocarbon stream 153 may then be passed to a naphtha splitter 236. The naphtha splitter 236 may be any unit that is operable to separate $C_4$-$C_6$ hydrocarbons from a feed stream. The naphtha splitter 236 may produce a third light hydrocarbon stream 187 and a third heavy hydrocarbon stream 155. In some embodiments, the naphtha splitter may include a hydrotreating unit $C_{7+}$ materials are hydrotreated. The third light hydrocarbon stream 187 may comprise at least a portion of the $C_4$-$C_6$ hydrocarbons present in the second heavy hydrocarbon stream 153. The third heavy hydrocarbon stream 155 may comprise at least a portion of the $C_{7+}$ hydrocarbons present in the second heavy hydrocarbon stream 153.

In one or more embodiments, the third light hydrocarbon stream 187 may be passed to a second reactor unit 230. The second reactor unit 230 may be any reaction vessel that is operable to catalytically convert at least a portion of the third light hydrocarbon stream 187 to one or more petrochemical products including, but not limited to, olefins and aromatics. Generally, FCC units may be suitable, such as risers, downers, or fixed bed FCC units. FCC units contemplated as suitable may include disclosed in WO 2020/109885, the teachings of which are incorporated herein by reference in their entirety.

The second reactor unit 230 may produce a second reactor unit effluent stream 189, where the concentration of olefins in the second reactor unit effluent stream 189 is higher when compared to that of the third light hydrocarbon stream 187. The second reactor unit effluent stream 189 may then be passed to the main fractionator unit 200. Without being bound by a theory, it is believed that passing the second reactor unit effluent stream 189 to the main fractionator unit 200 increases the amount of olefins in the $C_1$-$C_{12}$ stream 109 that is produced by the main fractionator unit 200 and further processed throughout the described system, thus increasing the output of olefins produced from this system.

In one or more embodiments, the second light hydrocarbon stream 191 produced by the debutanizer unit 234 may be passed to a $C_3$-$C_4$ processing system 504. This $C_3$-$C_4$ processing system 504 may first comprise passing the second light hydrocarbon stream 191 to an amine gas sweetening unit 258. The amine gas sweetening unit 258 may be any unit operable to remove at least a portion of acid gases, $H_2S$, and/or $CO_2$ from the second light hydrocarbon stream 191. The amine gas sweetening unit 258 may produce an amine gas sweetening unit effluent stream 193 that includes a lower concentration of acid gases, $H_2S$, and/or $CO_2$ when compared to the second light hydrocarbon stream 191. The amine gas sweetening unit effluent stream 193 may then be passed to a depropanizer unit 260. The depropanizer unit 260 may be any unit, like a distillation column, operable to separate $C_3$ hydrocarbons from the rest of the components present in the amine gas sweetening unit effluent stream 193. The depropanizer unit 260 may produce a first depropanizer unit effluent stream 301 and a second depropanizer unit effluent stream. The first depropanizer unit effluent stream 301 may comprise at least a portion to the majority of the $C_3$ hydrocarbons present in the amine gas sweetening unit effluent stream 193. The second depropanizer unit effluent stream may comprise at least a portion to the majority of $C_4$ hydrocarbons present in the amine gas sweetening unit effluent stream 193.

In one or more embodiments, the first depropanizer unit effluent stream 301 may be passed to a second selective hydrogenation unit 262. The second selective hydrogenation unit 262 may be any unit operable to achieve one or more of reducing the diolefin content of the first depropanizer unit effluent stream 301 by hydrogenating diolefins, minimizing the saturation of olefins, and converting mercaptans and sulphides to heavier sulfur molecules. The second selective hydrogenation unit 262 may produce a second selective hydrogenation unit effluent stream 303. The second selective hydrogenation unit effluent stream 303 may be passed to a $C_3$ splitter 264. The $C_3$ splitter 264 may be any unit that is operable to separate at least a portion of the propylene components of a stream from the rest of the stream. The $C_3$ splitter 264 may produce a propylene stream 305 and a $C_3$ splitter effluent stream 307. The propylene stream 305 may comprise at least a portion to the majority of the propylene content of the second selective hydrogenation unit effluent stream 303. The may comprise propane. The $C_3$ splitter effluent stream 307 may be passed to a second steam cracker 266. The second steam cracker 266 may be any unit that is operable to convert at least a portion of the propane components in the $C_3$ splitter effluent stream 307 to propylene. The second steam cracker 266 may produce a second steam cracker effluent stream 309, where the second steam cracker effluent stream 309 contains a higher concentration of propylene when compared to the $C_3$ splitter effluent stream 307. The second steam cracker effluent stream 309 may then be passed to the wash tower 228.

In one or more embodiments, the second depropanizer effluent stream 311 produced by the depropanizer unit 260 may be sent to a butadiene extraction distillation unit 268. The butadiene extraction distillation unit 268 may be any unit that is operable to separate at least a portion to the majority of the butadiene contents of the second depropanizer effluent stream 311. The butadiene extraction distillation unit 268 may produce a first butadiene extraction distillation unit effluent stream 315 and a second butadiene extraction distillation unit effluent stream 313. The second butadiene extraction distillation unit effluent stream 313 may comprise at least a portion to the majority of the butadiene components present in the second depropanizer effluent stream 311. The first butadiene extraction distillation unit effluent stream 315 may comprise the remaining contents of the second depropanizer effluent stream 311 after at least a portion to the majority of the butadiene components are removed. The second butadiene extraction distillation unit effluent stream 313 may be passed to a first hydrogenation unit 272. The first hydrogenation unit 272 may be any unit that is operable to hydrogenate the second butadiene extraction distillation unit effluent stream 313 and reduce the amount of double bonds in the butadiene components. The first hydrogenation unit 272 may produce a first hydrogenation unit effluent stream 317 that may then be sent to an isobutene converter unit 270. The first butadiene extraction distillation unit effluent stream 315 may also be passed to the isobutene converter unit 270. The isobutene converter unit 270 may be any unit that is operable to convert at least a portion of the isobutene content of the first butadiene extraction distillation unit effluent stream 315 and the first hydrogenation unit effluent stream 317 to one or more of tertiary butyl alcohol (TBA) and/or methyl tert-butyl ether (MTBE). The isobutene converter unit 270 may produce an isobutene converter unit effluent stream 319 that comprises a higher concentration of TBA and MTBE components when compared to the first butadiene extraction distillation unit effluent stream 315 and the first hydrogenation unit effluent stream 317. The isobutene converter unit effluent stream 319 may then be sent to a TBA/MTBE cracking unit 274. The TBA/MTBE cracking unit 274 may be any unit that is operable to convert the contents of the isobutene converter unit effluent stream 319 to one or more of 1-butene, isobutane, 2-butene, and n-butane. The TBA/MTBE cracking unit 274 may produce a TBA/MTBE cracking unit effluent stream 321.

In one or more embodiments, the TBA/MTBE cracking unit effluent stream 321 may be passed to a fractionator unit 276. The fractionator unit 276 may be any unit, like a distillation column, that is operable to separate one or more components of the TBA/MTBE cracking unit effluent stream 321 into one or more streams. The fractionator unit 276 may produce a first fractionator unit effluent stream 323 and a second fractionator unit effluent stream. The first fractionator unit effluent stream 323 may comprise at least a portion of the 1-butene and isobutane components present in the TBA/MTBE cracking unit effluent stream 321. The second fractionator unit effluent stream 325 may comprise at least a portion of the 2-butene, isobutane, and n-butane components present in the TBA/MTBE cracking unit effluent stream 321. The second fractionator unit effluent stream 325 may then be passed to a second hydrogenation unit 278. The second hydrogenation unit 278 may be any unit that is operable to hydrogenate one or more components of the second fractionator unit effluent stream 325 and reduce the amount of double bonds in the butene components. The second hydrogenation unit 278 may produce a second hydrogenation unit effluent stream 327. The second hydrogenation unit effluent stream 327 may then be passed to a third steam cracker 280. The third steam cracker 280 may be any unit that is operable to convert at least a portion of the butane components in the second hydrogenation unit effluent stream 327 to butene. The third steam cracker 280 may produce a third steam cracker effluent stream 329, where the third steam cracker effluent stream 329 contains a higher concentration of butene when compared to the second hydrogenation unit effluent stream 327. The third steam cracker effluent stream 329 may then be passed to the wash tower 228.

The wash tower 228 may receive the first steam cracker effluent stream 147, the second steam cracker effluent stream 309, and the third steam cracker effluent stream 329. The wash tower 228 may be any unit that is operable to remove one or more pollutants and/or unwanted materials from the first steam cracker effluent stream 147, the second steam cracker effluent stream 309, and the third steam cracker effluent stream 329. The wash tower 228 may produce a steam cracker recycle effluent stream 331. The steam cracker recycle effluent stream 331 may then be passed to the main fractionator unit 200. Without being bound by a theory, it is believed that including one or more of the first steam cracker 226, second steam cracker 266, and third steam cracker 280 in the disclosed system produces additional olefins that can then be recycled into the system and, thus, increase the overall production of olefin products that are produced from this system.

In one or more embodiments, the third heavy hydrocarbon stream 155 produced by the naphtha splitter 236 may be passed to an aromatics processing system 506. This aromatics processing system 506 may first comprise passing the third heavy hydrocarbon stream 155 to a separating unit 240. The separating unit 240 may be any unit that is operable to separate the third heavy hydrocarbon stream 155 into a stream consisting of $C_7$ hydrocarbons and a stream consisting of $C_{8+}$ hydrocarbons. The separating unit 240 may produce a first separating unit effluent stream 159 and a second separating unit effluent stream 171. The first separating unit effluent stream 159 may comprise at least a portion of the $C_7$ hydrocarbons from the third heavy hydrocarbon stream 155. The second separating unit effluent stream 171 may comprise at least a portion of the $C_{8+}$ hydrocarbons from the third heavy hydrocarbon stream 155. The first separating unit effluent stream 159 may be sent to a benzene column 244. The benzene column 244 may be any unit, like a distillation column, that is operable to separate benzene from the rest of the contents of the feed stream. The benzene column 244 may produce a benzene stream 163 and a benzene column effluent stream 165. The benzene stream 163 may comprise at least a portion to the majority of the benzene present in the first separating unit effluent stream 159. The benzene column effluent stream 165 may comprises less benzene when compared to the first separating unit effluent stream 159. The benzene column effluent stream 165 may then be sent to a toluene column 246. The toluene column 246 may be any unit, like a distillation column, that is operable to separate toluene from the rest of the contents of the feed stream. The toluene column 246 may produce a first toluene effluent stream 167 and a second toluene effluent stream 169.

In one or more embodiments, the second separating unit effluent stream 171 produced by the separating unit 240 and the second toluene effluent stream 169 produced by the toluene column 246 may be passed to a mixed xylene column 248. The mixed xylene column 248 may be any unit, like a distillation column, operable to separate $C_8$ hydrocarbons from the entering feed streams. The mixed xylene column 248 may produce a first mixed xylene column effluent stream 173 and a second mixed xylene column effluent stream 181. The first mixed xylene column effluent stream 173 may comprise at least a portion to the majority of the $C_8$ hydrocarbons present in the streams entering the mixed xylene column 248. The second mixed xylene column effluent stream 181 may comprise at least a portion to the majority of the $C_{9+}$ hydrocarbons present in the streams entering the mixed xylene column 248. The first mixed xylene column effluent stream 173 may be sent to a simulated moving bed reactor 250. The simulated moving bed reactor 250 may be any unit operable to produce p-xylene components from the first mixed xylene column effluent stream 173. For example, the simulated moving bed reactor 250 may utilize an adsorbent and/or a catalyst in order to increase the production of p-xylene from the first mixed xylene column effluent stream 173. The simulated moving bed reactor 250 may produce a p-xylene stream 175 and a simulated moving bed reactor effluent stream 177. The p-xylene stream 175 may comprise at least a portion to the majority of the p-xylene produced from the simulated moving bed reactor 250. The simulated moving bed reactor effluent stream 177 may comprise the rest of the contents of the simulated moving bed reactor 250 with at least a portion to the majority of the p-xylene components removed. The simulated moving bed reactor effluent stream 177 may be passed to a xylene isomerization unit 252. The xylene isomerization unit 252 may be any unit operable to increase the concentration of orthoxylene and paraxylene components when compared to the simulated moving bed reactor effluent stream 177. The xylene isomerization unit 252 may produce a xylene isomerization recycle stream 179 that can then be recycled to the mixed xylene column 248.

In one or more embodiments, the second mixed xylene column effluent stream 181 produced by the mixed xylene column 248 may be sent to a heavy aromatics column 254. The heavy aromatics column 254 may be any unit operable to separate $C_{11+}$ hydrocarbons from the rest of the components present in the second mixed xylene column effluent stream 181. The heavy aromatics column 254 may produce a first heavy aromatics column effluent stream 183 and a second heavy aromatics column effluent stream 185. The first heavy aromatics column effluent stream 183 may comprise at least a portion to the majority of $C_{11+}$ hydrocarbons present in the second mixed xylene column effluent stream 181. The second heavy aromatics column effluent stream 185 may comprise at least a portion to the majority of $C_9$-$C_{10}$ hydrocarbons present in the second mixed xylene column effluent stream 181. The second heavy aromatics column effluent stream 185 may then be sent to a transalkylation unit 256. The transalkylation unit 256 may be any unit operable to convert toluene components of the entering feed streams to benzene and/or xylene components. The first toluene effluent stream 167 may also be passed to the transalkylation unit 256.

Examples

Examples are provided herein which may disclose one or more embodiments of the present disclosure. However, the Examples should not be viewed as limiting on the claimed embodiments hereinafter provided.

Table 1 below presents the experimental yields in addition to the software simulated yields in weight percents of various light gases obtained by running the overall process described in the present disclosure where the second reactor unit ran at 625° C. and after running the process for 28 minutes.

$CH_4$ refers to methane. $C_2H_6$ refers to ethane. $C_2H_4$ refers to ethylene/ethene. $C_3H_8$ refers to propane. $C_3H_6$ refers to propylene/propene. $iC_4H_{10}$ refers to isobutane. $nC_4H_{10}$ refers to n-butane. $C_4H_8$ refers to butylene/butene. $C_{5+}$ refers to all other compounds produced that contain five or more carbon atoms.

TABLE 1

| Component | Experimental (wt. %) | Simulation (wt. %) |
| --- | --- | --- |
| $CH_4$ | 4.1 | 5.5 |
| $C_2H_6$ | 3.4 | 0.0 |
| $C_2H_4$ | 9.3 | 14.2 |
| $C_3H_8$ | 4.4 | 0.0 |
| $C_3H_6$ | 17.7 | 18.7 |

TABLE 1-continued

| Component | Experimental (wt. %) | Simulation (wt. %) |
|---|---|---|
| $iC_4H_{10}$ | 1.5 | 1.5 |
| $nC_4H_{10}$ | 1.4 | 1.4 |
| $C_4H_8$ | 8.3 | 8.5 |
| $C_{5+}$ | 49.9 | 50.2 |
| Total | 100 | 100 |

Table 2 below presents the experimental yields in weight percents of various products produced by running the overall process where the third light hydrocarbon stream is recycled to the second reactor unit and by running the overall process where the third light hydrocarbon stream is not recycled to the second reactor unit (referring to steams in FIG. 1) As important to note, when the process was run where the third light hydrocarbon stream was recycled to the second reactor unit, about 43.1 wt. % of the products were made up of ethene and propene and about 59.5 wt. % of the products were made up of ethene, propene, benzene, toluene, and xylene. Thus, there was an increased weight percentage of ethene, propene, benzene, toluene, and xylene produced when recycling the third light hydrocarbon stream to the second reactor unit when compared to not utilizing this recycling step.

$H_2S$ refers to hydrogen sulfide. $H_2$ refers to hydrogen gas. $C_1$ refers to methane ($CH_4$). $C_2$ refers to ethane ($C_2H_6$). $C_{2=}$ refers to ethene ($C_2H_4$). $C_3$ refers to propane ($C_3H_8$). $C_{3=}$ refers to propene ($C_3H_6$). $iC_4$ refers to isobutene ($iC_4H_{10}$). $nC_4$ refers to n-butane ($nC_4H_{10}$). $iC_{4=}$ refers to isobutylene ($iC_4H_8$). $C_{4==}$ refers to butadiene ($C_4H_6$). BTX refers to benzene ($C_6H_6$), toluene ($C_7H_8$), and xylene ($C_8H_{10}$). $C_{5+}$ refers to all compounds produced that contain five or more carbon atoms. LCO refers to light cycle oil. HCO refers to heavy cycle oil.

TABLE 2

| Component | Process without Second Reactor (wt. %) | Process with Second Reactor (wt. %) |
|---|---|---|
| $H_2S$ | 0.47 | 0.47 |
| $H_2$ | 0.12 | 0.43 |
| $C_1$ | 2.3 | 4.27 |
| $C_2$ | 2.33 | 0.0 |
| $C_{2=}$ | 5.83 | 14.03 |
| $C_3$ | 3.3 | 0.0 |
| $C_{3=}$ | 21.44 | 29.03 |
| $iC_4$ | 1.41 | 0.0 |
| $nC_4$ | 1.82 | 0.0 |
| $iC_{4=}$ | 4.9 | 0.0 |
| $1C_{4=}$ | 3.38 | 0.0 |
| $C_2C_{4=}$ | 1.85 | 0.0 |
| $t_2C_{4=}$ | 2.69 | 0.0 |
| $C_{4==}$ | 0.18 | 0.0 |
| BTX | 13.7 | 16.41 |
| $C_{5+}$ | 11.3 | 12.34 |
| LCO | 10.94 | 10.94 |
| Coke & HCO | 12.11 | 12.07 |
| $C_{2=}$ & $C_{3=}$ | 27.27 | 43.1 |
| $C_{2=}$, $C_{3=}$, & BTX | 53.98 | 59.5 |

The present disclosure includes multiple aspects. A first aspect is a method of processing a hydrocarbon feed stream, the method comprising: catalytically cracking a hydrocarbon feed stream in a counter-current reactor to produce a first effluent stream; processing a portion or all of the first effluent stream by at least one or more separations to form at least: a second effluent stream comprising at least 95 wt. % C4-C6 hydrocarbons; a third effluent stream comprising at least 95 wt. % of ethane, propane, or a combination thereof; and catalytically cracking a portion or all of the second effluent stream in a second reactor to form a second reactor effluent stream; combining a portion of all of the second reactor effluent stream with the first effluent stream; steam cracking a portion or all of the third effluent stream to form a steam cracked effluent stream; and combining a portion or all of the steam cracked effluent stream with the first effluent.

Another embodiment includes any previous aspect or combination of aspects, wherein the hydrocarbon feed stream is crude oil diluted with steam.

Another embodiment includes any previous aspect or combination of aspects, wherein the crude oil in the hydrocarbon stream has an American Petroleum Institute (API) gravity of from 22 degrees to 40 degrees.

Another embodiment includes any previous aspect or combination of aspects, wherein the hydrocarbon feed stream has a final boiling point of from 40° C. to 800° C.

Another embodiment includes any previous aspect or combination of aspects, wherein: the third effluent stream comprises at least 95 wt. % ethane; processing the first effluent by at least one or more separations forms a fourth effluent stream; and the fourth effluent stream comprises at least 95 wt. % propane.

Another embodiment includes any previous aspect or combination of aspects, further comprising: steam cracking the fourth effluent stream to form a second steam cracked effluent stream; and passing the second steam cracked effluent stream to the counter-current reactor.

Another embodiment includes any previous aspect or combination of aspects, wherein: processing the first effluent by at least one or more separations forms a fifth effluent stream comprising at least 90 wt. % $C_7$-$C_{12}$ hydrocarbons; the method further comprises processing the fifth effluent stream by BTX extraction to form a sixth effluent stream.

Another embodiment includes any previous aspect or combination of aspects, further comprising passing the sixth effluent stream to the second reactor.

Another embodiment includes any previous aspect or combination of aspects, further comprising passing the sixth effluent stream to the counter-current reactor.

Another embodiment includes any previous aspect or combination of aspects, wherein: the counter-current reactor comprises an upper reaction zone and a lower reaction zone; the upper reaction zone operates with a counter-current plug flow regime; the lower reaction zone operates with a dense bed fluidization regime.

Another embodiment is a method of processing a hydrocarbon feedstock, the method comprising: catalytically cracking a hydrocarbon feed stream in a counter-current reactor to produce a first effluent stream; processing a portion or all of the first effluent stream by at least one or more separations to form at least: a second effluent stream comprising at least 95 wt. % $C_4$-$C_6$ hydrocarbons; and a third effluent stream comprising at least 95 wt. % of ethane, propane, or a combination thereof; passing a portion or all of the second effluent stream to the counter-current reactor; steam cracking a portion or all of the third effluent stream to form a steam cracked effluent stream; and combining a portion or all of the steam cracked effluent stream with the first effluent stream.

Another embodiment includes any previous aspect or combination of aspects, wherein the hydrocarbon feed stream is a mixture of crude oil and steam.

Another embodiment includes any previous aspect or combination of aspects, wherein the hydrocarbon feed stream has an American Petroleum Institute (API) gravity of from 22 degrees to 40 degrees.

Another embodiment includes any previous aspect or combination of aspects, wherein the hydrocarbon feed stream has a final boiling point of from 40° C. to 800° C.

Another embodiment includes any previous aspect or combination of aspects, wherein: the third effluent stream comprises at least 95 wt. % ethane; processing the first effluent by at least one or more separations forms a fourth effluent stream; and the fourth effluent stream comprises at least 95 wt. % propane.

Another embodiment includes any previous aspect or combination of aspects, further comprising: steam cracking the fourth effluent stream to form a second steam cracked effluent stream; and passing the second steam cracked effluent stream to the counter-current reactor.

Another embodiment includes any previous aspect or combination of aspects, wherein: processing the first effluent by at least one or more separations forms a fifth effluent stream comprising at least 90 wt. % $C_7$-$C_{12}$ hydrocarbons; and the method further comprises processing the fourth stream by BTX extraction to form a sixth effluent stream.

Another embodiment includes any previous aspect or combination of aspects, further comprising passing the sixth effluent stream to the counter-current reactor.

Another embodiment includes any previous aspect or combination of aspects, wherein: the counter-current reactor comprises an upper reaction zone and a lower reaction zone; the upper reaction zone operates with a counter-current plug flow regime; and the lower reaction zone operates with a dense bed fluidization regime.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

It should be understood that where a first component is described as "comprising" a second component, it is contemplated that, in some embodiments, the first component "consists" or "consists essentially of" that second component. It should further be understood that where a first component is described as "comprising" a second component, it is contemplated that, in some embodiments, the first component comprises at least 10%, at least 20%, at least 30%, at least 40%, at least 50%, at least 60%, at least 70%, at least 80%, at least 90%, at least 95%, or even at least 99% that second component (where % can be weight % or molar %).

It is also noted that recitations herein of "at least one" component, element, etc., should not be used to create an inference that the alternative use of the articles "a" or "an" should be limited to a single component, element, etc.

For the purposes of describing and defining the presently described technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

The invention claimed is:

1. A method of processing a hydrocarbon feed stream, the method comprising:
   catalytically cracking a hydrocarbon feed stream in a counter-current reactor to produce a first effluent stream;
   processing a portion or all of the first effluent stream by at least one or more separations to form at least:
   a second effluent stream comprising at least 95 wt. % $C_4$-$C_6$ hydrocarbons;
   a third effluent stream comprising at least 95 wt. % of ethane, propane, or a combination thereof; and
   catalytically cracking a portion or all of the second effluent stream in a second reactor to form a second reactor effluent stream;
   combining a portion of all of the second reactor effluent stream with the first effluent stream;
   steam cracking a portion or all of the third effluent stream to form a steam cracked effluent stream; and
   combining a portion or all of the steam cracked effluent stream with the first effluent.

2. The method of claim 1, wherein the hydrocarbon feed stream is crude oil diluted with steam.

3. The method of claim 2, wherein the crude oil in the hydrocarbon stream has an American Petroleum Institute (API) gravity of from 22 degrees to 40 degrees.

4. The method of claim 1, wherein the hydrocarbon feed stream has a final boiling point of from 40° C. to 800° C.

5. The method of claim 1, wherein: the third effluent stream comprises at least 95 wt. % ethane; processing the first effluent by at least one or more separations forms a fourth effluent stream; and the fourth effluent stream comprises at least 95 wt. % propane.

6. The method of claim 5, further comprising:
   steam cracking the fourth effluent stream to form a second steam cracked effluent stream; and
   passing the second steam cracked effluent stream to the counter-current reactor.

7. The method of claim 1, wherein:
   processing the first effluent by at least one or more separations forms a fifth effluent stream comprising at least 90 wt. % $C_7$-$C_{12}$ hydrocarbons;
   the method further comprises processing the fifth effluent stream by BTX extraction to form a sixth effluent stream.

8. The method of claim 7, further comprising passing the sixth effluent stream to the second reactor.

9. The method of claim 7, further comprising passing the sixth effluent stream to the counter-current reactor.

10. The method of claim 1, wherein:
    the counter-current reactor comprises an upper reaction zone and a lower reaction zone;
    the upper reaction zone operates with a counter-current plug flow regime;
    the lower reaction zone operates with a dense bed fluidization regime.

11. A method of processing a hydrocarbon feedstock, the method comprising:
    catalytically cracking a hydrocarbon feed stream in a counter-current reactor to produce a first effluent stream;
    processing a portion or all of the first effluent stream by at least one or more separations to form at least:

a second effluent stream comprising at least 95 wt. % $C_4$-$C_6$ hydrocarbons; and a third effluent stream comprising at least 95 wt. % of ethane, propane, or a combination thereof;

passing a portion or all of the second effluent stream to the counter-current reactor;

steam cracking a portion or all of the third effluent stream to form a steam cracked effluent stream; and combining a portion or all of the steam cracked effluent stream with the first effluent stream;

wherein one or more of:
(1) the hydrocarbon feed stream is a mixture of crude oil and steam;
(2) the method of processing the hydrocarbon feedstock further comprises steam cracking the fourth effluent stream to form a second steam cracked effluent stream, and passing the second steam cracked effluent stream to the counter-current reactor; or
(3) the counter-current reactor comprises an upper reaction zone and a lower reaction zone, the upper reaction zone operates with a counter-current plug flow regime, and the lower reaction zone operates with a dense bed fluidization regime.

12. The method of claim 11, wherein the hydrocarbon feed stream is a mixture of crude oil and steam.

13. The method of claim 11, wherein the hydrocarbon feed stream has an American Petroleum Institute (API) gravity of from 22 degrees to 40 degrees.

14. The method of claim 11, wherein the hydrocarbon feed stream has a final boiling point of from 40° C. to 800° C.

15. The method of claim 11, wherein: the third effluent stream comprises at least 95 wt. % ethane; processing the first effluent by at least one or more separations forms a fourth effluent stream; and the fourth effluent stream comprises at least 95 wt. % propane.

16. The method of claim 15, wherein the method of processing the hydrocarbon feedstock further comprises
steam cracking the fourth effluent stream to form a second steam cracked effluent stream, and
passing the second steam cracked effluent stream to the counter-current reactor.

17. The method of claim 15, wherein:
processing the first effluent by at least one or more separations forms a fifth effluent stream comprising at least 90 wt. % $C_7$-$C_{12}$ hydrocarbons; and
the method further comprises processing the fourth effluent stream by BTX extraction to form a sixth effluent stream.

18. The method of claim 17, further comprising passing the sixth effluent stream to the counter-current reactor.

19. The method of claim 11, wherein
the counter-current reactor comprises an upper reaction zone and a lower reaction zone,
the upper reaction zone operates with a counter-current plug flow regime, and
the lower reaction zone operates with a dense bed fluidization regime.

* * * * *

UNITED STATES PATENT AND TRADEMARK OFFICE
CERTIFICATE OF CORRECTION

| | | |
|---|---|---|
| PATENT NO. | : 11,965,133 B2 | Page 1 of 1 |
| APPLICATION NO. | : 18/059761 | |
| DATED | : April 23, 2024 | |
| INVENTOR(S) | : Almajnouni et al. | |

It is certified that error appears in the above-identified patent and that said Letters Patent is hereby corrected as shown below:

On the Title Page

Item (72) Inventors: "Mohammed Alabdullah, Thuwal (SA)" should read --Mohammed Alabdullah, Dammam (SA)--.

Signed and Sealed this
Thirteenth Day of August, 2024

Katherine Kelly Vidal
*Director of the United States Patent and Trademark Office*